Figure 1:
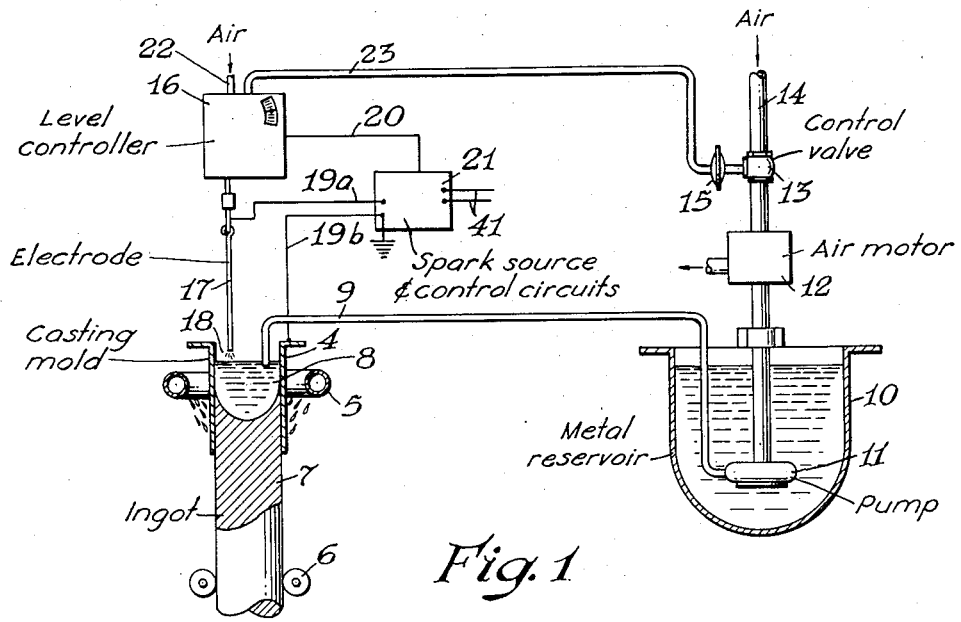

April 10, 1951     O. E. BARSTOW ET AL     2,548,696

SPARK GAP LIQUID LEVEL INDICATOR

Filed Oct. 20, 1947     2 Sheets-Sheet 1

INVENTORS.
Ormond E. Barstow
Clarence A. Pippin
BY
Griswold & Burdick
ATTORNEYS

April 10, 1951     O. E. BARSTOW ET AL     2,548,696
SPARK GAP LIQUID LEVEL INDICATOR Filed Oct. 20, 1947     2 Sheets-Sheet 2

INVENTORS.
Ormond E. Barstow
Clarence A. Pippin
BY
Griswold & Burdick
ATTORNEYS

Patented Apr. 10, 1951

2,548,696

UNITED STATES PATENT OFFICE 2,548,696

SPARK-GAP LIQUID LEVEL INDICATOR

Ormond E. Barstow and Clarence A. Pippin, Midland, Mich., assignors to The Dow Chemical Company, Midland, Mich., a corporation of Delaware Application October 20, 1947, Serial No. 780,880

3 Claims. (Cl. 318—482)

1

This invention relates to an electrical instrument for indicating or controlling the level of a body of electrically conductive liquid. It also concerns continuous ingot-casting apparatus in which the new instrument is a control element.

In one type of continuous metal casting process, a stream of molten metal is introduced into the top of a cooled vertical casting mold in which the metal freezes progressively and from beneath which it is constantly lowered away as cast ingot. (See, for example, U. S. Patents 2,135,183 (Junghans), 2,301,027 (Ennor), and 2,410,837 (Peters)). The making of sound ingot by this process requires avoidance of fluctuations in the level of the molten metal in the mold. To this end, it is necessary to control carefully the rate at which molten metal is introduced into the mold, either by hand or by an automatic mechanism of some sort.

Several types of level control elements have been tried heretofore, but none has operated satisfactorily for more than a short time. Thus, floats, on prolonged exposure to red-hot molten metal, tend to change in weight and give false indications, and sometimes also interfere with the manner in which freezing takes place in the mold. Temperature-sensitive elements, when used to detect level changes in the mold by observing the accompanying thermal effects, respond too slowly to permit close control. Electric contact indicators are quite unreliable in that the necessary electrodes foul rapidly during repeated contact with the surface of molten metal. Other known types of level controllers have also proved ineffective.

It is therefore the principal object of the present invention to provide a simple, rugged level indicator for use with continuous metal casting molds which avoids the disadvantages of prior controllers and which operates with precision over long periods. A further object is to provide an instrument for indicating the level of electrically-conductive liquids in which no part of the instrument ever actually touches the liquid. These and related objects are realized in the instrument of the present invention, hereinafter fully described.

In indicating the level of an electrically-conductive liquid, the new instrument operates on the principle of maintaining one end of a movable rod-like electrode close to but out of contact with the surface of the liquid and causing a low-intensity spark discharge to traverse continuously the gap between the electrode and the liquid. Any change in the level of the liquid alters the length of the spark gap, and is thus accompanied by a corresponding change in the electrical condition of the spark circuit. This change is detected by an appropriate second circuit which in turn actuates mechanism for moving the electrode toward or from the liquid until the initial spark gap length is restored. Since this corrective response can be made very rapid, the electrode in effect is always maintained at a substantially constant distance from the liquid surface, and thus appears to 'float" with it, although never actually touching it. The "floating" electrode may readily be coupled to a pointer or other position indicator, or to an automatic level-control mechanism of any desired type.

Figure 2:
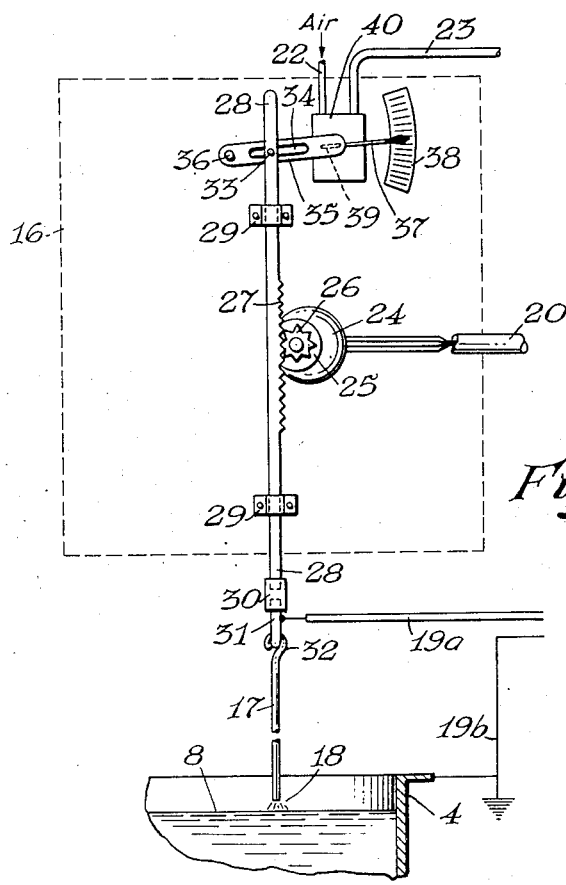
Figure 3:
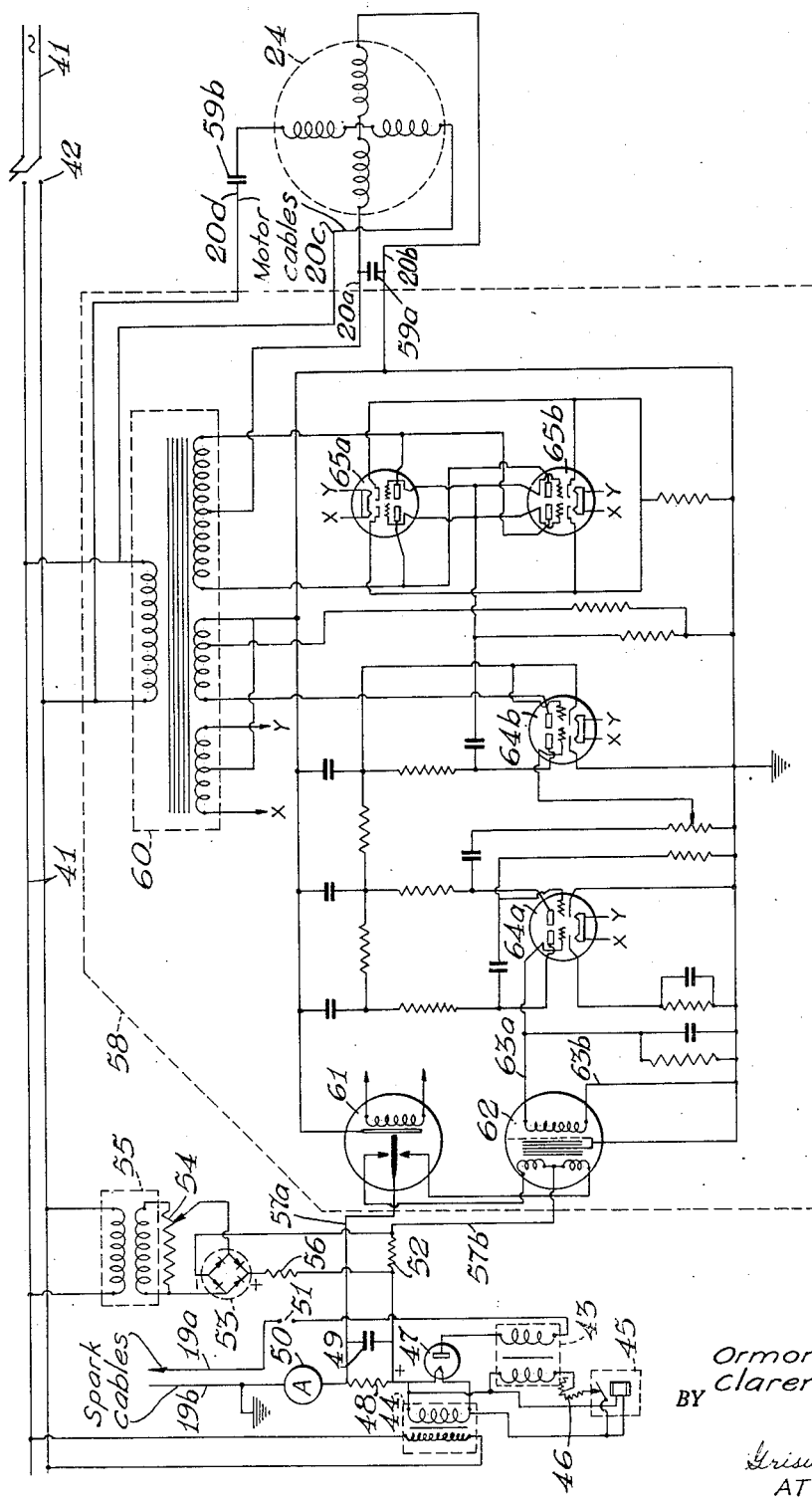

The instrument of the invention, in a preferred form, may be explained in detail with reference to the accompanying schematic drawings, in which Fig. 1 is an elevation, partly in section, showing a level indicator according to the invention used with a continuous ingot-casting apparatus;

Fig. 2 is an elevation of the mechanical working parts of the indicator of Fig. 1; and Fig. 3 is a circuit diagram of the electrical equipment for actuating the mechanism of Fig. 2.

In the apparatus shown in Fig. 1, a molten metal, such as a magnesium-base alloy, is being cast continuously in a vertical cylindrical mold 4 provided with the usual cooling-water spray ring 5 and with rolls 6 for lowering cast ingot 7 from the mold. The molten metal 8 is introduced into the mold as a steady stream from an inlet pipe 9 through which it is supplied from a reservoir 10 by a submerged pump 11 direct-driven by an air motor 12. The speed of the motor, and thus also the delivery rate of the metal, may be regulated by a throttling valve 13 in the air supply line 14 to the motor, the valve being controlled by a diaphragm-actuator 15.

The level of the molten metal in the mold 4 is indicated and controlled by an instrument according to the invention, the working mechanism of which is encased in a housing 16 mounted directly above the mold. A steel electrode rod 17 hangs below the housing, the entire assembly being positioned so that the lower end of the rod is slightly above the surface of the metal in the mold to form a spark gap 18 therewith. Spark cables 19a and 19b and a control circuit cable 20 lead from the electrode 17, the mold 4, and the controller housing 16 to an electrical supply box 21 at some clean, dry location. A small air line 22 also enters the housing 16, and a valve-control air hose 23 leads from it to the diaphragm-actuator 15 on the pump control valve.

The essentials of the electrode control mechanism are illustrated in Fig. 2. As there shown, the electrode 17 is raised or lowered by a split-field reversible motor 24, the operating current for which is derived from the supply box 21 through the four-wire control cable 20. The motor is designed to withstand stalling and is provided with a built-in gear-reducer 25 which terminates in a pinion 26 engaging a vertically reciprocable rack 27. This rack forms the central portion of a long rod 28 mounted slidably in guides 29, the latter being placed so that they also serve as stops to prevent overrunning of the rack. An electric insulator 30 is threaded onto the lower end of the rod 28, the insulator also being threaded to receive a metal eye bolt 31 to which the spark cable 19a is firmly connected. The spark electrode rod 17, which is formed to a hook 32 at its upper end, swings freely from the eye bolt.

At its upper end the rod 28 carries a pin 33 which fits into a slot 34 on a pointer arm 35 pivoted at 36. The free end of the arm 35 is provided with pointer needle 37 which may be read against a scale 38 calibrated to indicate the vertical position of the electrode rod 17. The pointer arm 35 also carries on its back side a vane 39 which cooperates with a pneumatic position controller 40. The latter, indicated only generally, is a standard instrument element which receives steady air pressure from the inlet 22 and transmits to the diaphragm-actuator 15 through the hose 23 a control air pressure which it varies in accordance with the position of the pointer arm 35 and vane 39.

Within the electric supply box 21 (Fig. 1) are the sources of the spark current for the electrode 17 and of the operating current for the motor 24, these sources being indicated diagrammatically in Fig. 3. All the circuits shown derive their power from a 110-v. A. C. supply line 41 through a master switch 42.

The spark current for the electrode 17 is developed in a high-voltage low-current induction coil 43, the primary of which is supplied through a transformer 44, interrupter 45, and rheostat 46. One side of the secondary of the coil 43 is connected through a diode rectifier 47, a fixed resistor 48 having a stabilizing condenser 49 in parallel, and an ammeter 50, to the grounded cable 19b leading to the casting mold 4. The other side of the secondary is connected through a safety spark-gap 51 directly to the insulated cable 19a leading to the spark electrode 17. (The function of the gap, which may be an automotive spark plug set at 0.025 inch, is merely to limit the spark current to a safe value in the event a workman should accidentally touch the electrode 17 and ground the spark circuit through his body.) In operation of the spark circuit, the rectified spark current, conveniently set by the rheostat 46 at about one milliampere at 10,000 to 15,000 volts, flows from the coil 43 through the resistor 48 (e. g. 20 ohms) and the cable 19b to the molten metal 8 in the mold 4. From there it jumps the gap 18 to the spark electrode 17 and thence back through the cable 19a and safety gap 51 to the coil 43.

This flow of current in the spark circuit creates a potental across the resistor 48. This potential is opposed, in the motor-control circuit now to be described, by a reference potential of like magnitude maintained at a constant value in the resistor 52. The reference potential is produced by current from a full-wave rectifier 53 deriving its energy from a potentiometer 54 supplied by a transformer 55, the current being limited to an appropriate value by the additional resistor 56.

The resultant of the opposing potentials in the resistors 48 and 52 is transferred by the leads 57a and 57b to the input of the amplifier 58. The output of the amplifier is transmitted by leads 20a and 20b within the cable 20 to one field of the split-field electrode control motor 24, the usual motor capacitor 59a being shunted across these leads. The other field of the motor is connected directly by the leads 20c and 20d to the power supply 41, the lead 20d containing another motor capacitor 59b.

The amplifier 58 itself is an inverter-amplifier of standard type intended for receiving a small D. C. input and producing an A. C. power output proportional to and phased in accordance with the magnitude and polarity of the input. As shown schematically in Fig. 3, the amplifier 58 derives its energy from the line 41 through a power transformer 60. The D. C. input from the leads 57a and 57b is imposed on a converter 61 and input transformer 62. The resulting alternating current in the leads 63a and 63b passes through three stages of amplification in the double triodes 64a and 64b, and thence through a phase discriminator circuit involving the power double triodes 65a and 65b to the motor leads 20a and 20b.

In operating the instrument and casting apparatus of Figs. 1 to 3, the controller 16 is set in place above the casting mold 4 and is raised or lowered so that the lower end of spark electrode 17 comes within about one-fourth inch of the surface of the molten metal 8 when the pointer 37 is set to read opposite the zero position on the scale 38. The cables 19a, 19b and 20 and the hose 23 are installed. The master switch 42 to the electrical supply box is closed, and air pressure is applied to the controller inlet 22. Casting may then be carried out by actuating the pump 11 and withdrawing the cast ingot 7 from below the mold 4.

With the electrical circuits in operation, spark current continuously jumps the gap 18 from the electrode 17 to the metal 8. The potentiometer 54 is then adjusted until the motor control circuit is in balance, i. e. until the potential between the amplifier leads 57a and 57b is zero, rendering the motor 24 inactive, so that it neither raises nor lowers the electrode 17.

If, under these conditions, the level of the metal 8 changes slightly, the length of the spark gap 18 is altered and the value of the spark current flowing through the resistor 48 changes. At once a potential exists across the leads 57a—57b of the amplifier input. The amplifier then develops an output through the leads 20a and 20b to the motor 24, causing the motor 24 to turn and to raise or lower the electrode 17, depending on which of the wires 57a and 57b is positive to the other, until the spark current returns to the initial value. The motion of the electrode 17 is of course accompanied by a corresponding motion of the controller pointer arm 35 which in turn actuates the pneumatic controller 40. This latter alters the pressure in the hose 23 and hence changes the setting of the motor control valve 13. The speed of the pump 11 is thus varied, changing the rate of metal flow into the mold 4 so as to restore the initial level of molten metal in the mold. As the metal level returns to normal, the electrode 17 follows correspondingly, and all conditions return to the predetermined operating state.

In actual practice, the response of the indicating and control elements can be made very rapid so that the level of metal in the casting mold is easily controlled to within one-eighth inch even at the high rates of metal flow necessary for casting 12-inch and larger ingots.

From the foregoing, it will be appreciated that the new instrument possesses a number of significant advantages. It operates very much as would a float controller, but never actually touches the surface of the molten metal. All parts of the instrument near the casting apparatus can be made rugged and can readily be enclosed in a protective case. The spark electrode itself is an inexpensive element which may be instantly replaced in case of damage. There are no electrical hazards for operating personnel. From actual experience, it has been found that trouble-free operation during casting runs of many days' duration is readily obtainable.

It is to be understood that the foregoing description is illustrative rather than strictly limitative and that the invention is co-extensive in scope with the following claims.

What is claimed is:

1. An instrument for indicating the level of a body of electrically conductive liquid comprising a rod electrode mounted for vertical movement toward and from the surface of the body, a reversible motor for thus moving the electrode, a circuit for maintaining a continuous spark between the electrode and the liquid body including in series the electrode, a source of high-voltage current including a spark coil, a rectifier, and a resistor, a second circuit comprising a source of a reference potential connected to oppose the potential maintained across the spark circuit resistor by the spark current, an electron-tube amplifier having its input connected to measure the resultant of the opposed reference and resistor potentials and its output connected to actuate the aforesaid reversible motor to move the electrode in the direction to alter the spark current to equate the opposed reference and spark potentials, and an indicator operatively connected with the motor for showing the position of the electrode.

2. An instrument according to claim 1, wherein the spark circuit includes a fixed spark gap for limiting current flow in the event of accidental grounding of the movable electrode.

3. In an instrument responsive to the level of a body of electrically conductive liquid and having an electrode mounted for movement toward and from the surface of the body, a reversible motor for thus moving the electrode, and additional means to be controlled operatively connected with the motor, the combination of a circuit for maintaining a continuous spark between the electrode and the liquid body including in series the electrode, a source of high-voltage alternating current, a rectifier, and a resistor, a second circuit comprising a source of a reference potential connected to oppose the potential maintained across the resistor by the spark current, and an electron-tube amplifier having its input connected to the resultant of the opposed reference and resistor potentials and its output connected to actuate the aforesaid reversible motor to move the electrode in the direction to alter the spark current to equate the opposed spark and reference potentials.

ORMOND E. BARSTOW.
CLARENCE A. PIPPIN.

REFERENCES CITED

The following references are of record in the file of this patent:

UNITED STATES PATENTS

| Number | Name | Date |
| --- | --- | --- |
| 1,503,479 | Coats | Aug. 5, 1924 |
| 1,928,016 | Halbach et al. | Sept. 26, 1933 |
| 2,032,016 | Hitner | Feb. 25, 1936 |
| 2,175,009 | Anderson | Oct. 3, 1939 |
| 2,243,425 | Junghans | May 27, 1941 |
| 2,246,907 | Webster | June 24, 1941 |
| 2,259,958 | Levy | Oct. 21, 1941 |
| 2,293,079 | Ranke | Aug. 18, 1942 |
| 2,398,341 | Wills | Apr. 9, 1946 |